July 11, 1939.   I. JEPSON   2,165,858

ELECTRIC MOTOR

Filed Feb. 4, 1938   3 Sheets-Sheet 1

Inventor:
Ivar Jepson
By
McCanna, Wintercorn & Morsbach
Attys.

July 11, 1939.   I. JEPSON   2,165,853
ELECTRIC MOTOR
Filed Feb. 4, 1938   3 Sheets-Sheet 2
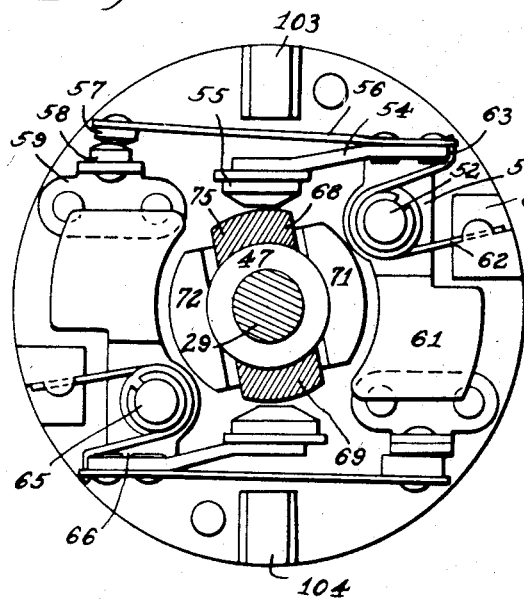
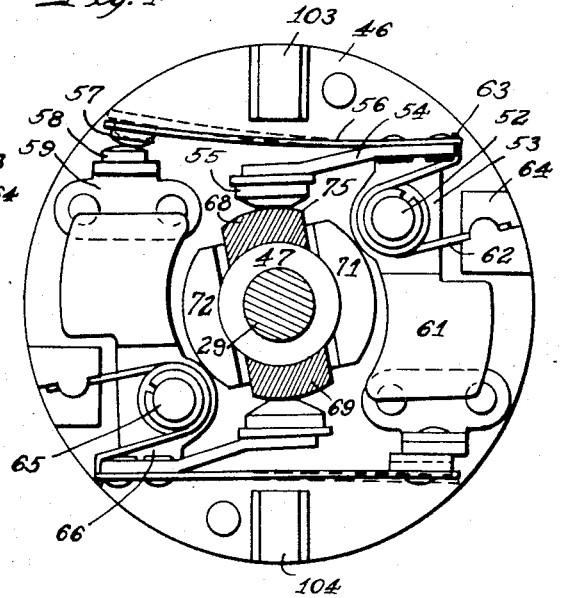
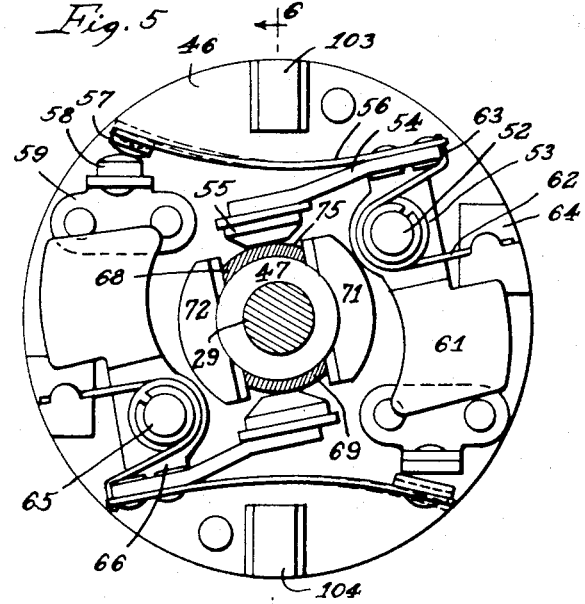
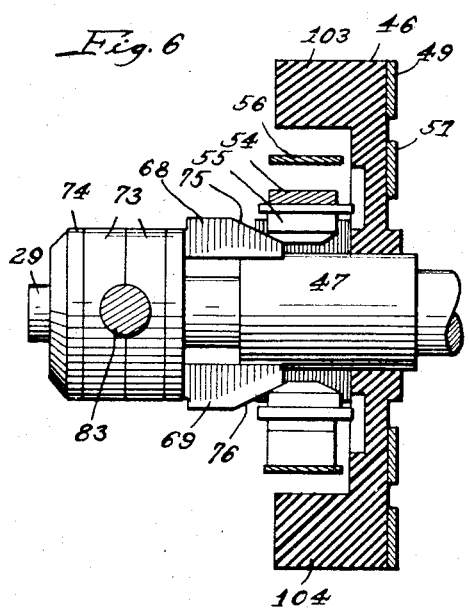
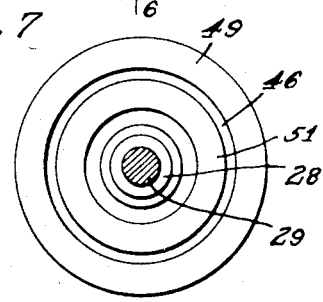
Inventor:
Ivar Jepson
By
McCanna, Wintercorn & Morsbach
Attys.

July 11, 1939.  I. JEPSON  2,165,858
ELECTRIC MOTOR
Filed Feb. 4, 1938  3 Sheets-Sheet 3
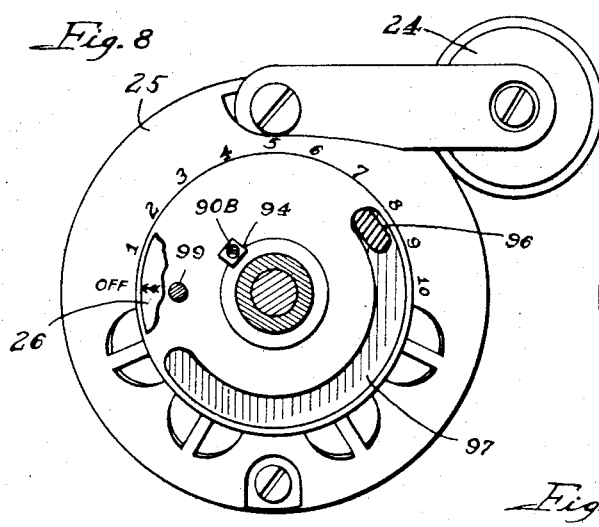
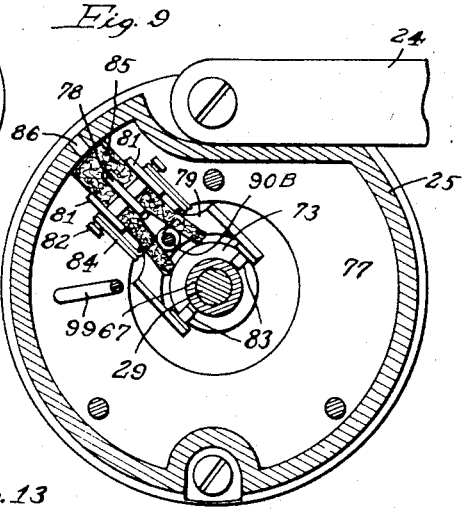
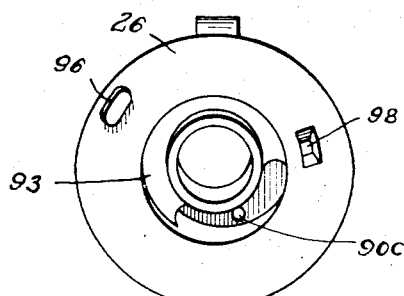
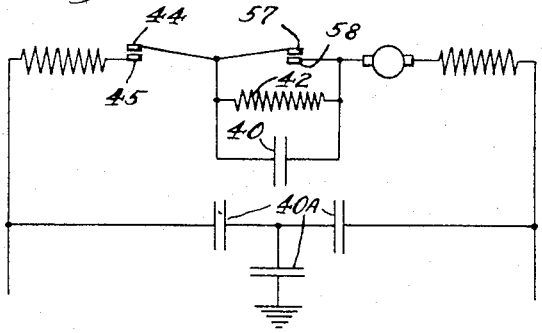
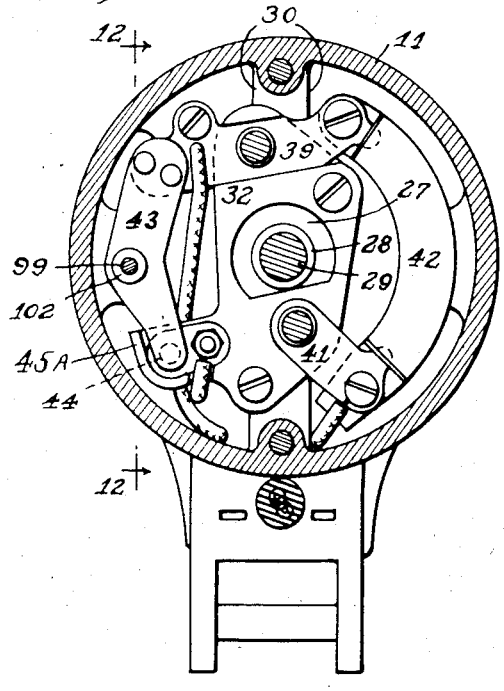
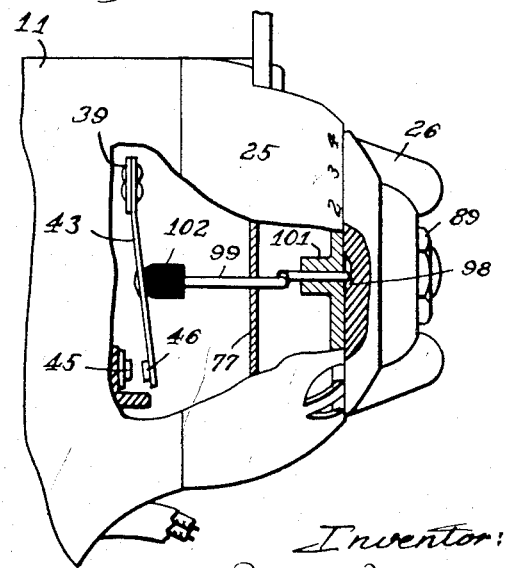
Inventor:
Ivar Jepson
By
McCanna, Wintercorn & Morsbach
Attys.

Patented July 11, 1939

2,165,858

UNITED STATES PATENT OFFICE 2,165,858

ELECTRIC MOTOR

Ivar Jepson, Chicago, Ill., assignor to Chicago Flexible Shaft Company, Chicago, Ill., a corporation of Illinois Application February 4, 1938, Serial No. 188,695

20 Claims. (Cl. 172—36)

This invention relates to electric motors and has special reference to a motor of the type particularly adapted for use in food mixers wherein the motor proper, speed control, and drive mechanism are all confined in a single casing for portability and for economy in size and weight.

It is a matter of primary importance in mixers of the type herein contemplated that the size and weight of the motor unit be held at a minimum in order to be capable of portable use by women. It is likewise necessary that the operating mechanism be, as far as possible, enclosed so as to present an ornamental appearance and to permit of easy washing or cleaning. On the other hand, many functions must be performed by the mechanism within the casing which must embody a motor of sufficient power to perform the required operations, and such a motor is relatively large in size so that it normally substantially fills the enclosure within the casing. Under these circumstances the details of construction and arrangement of the various parts become matters of primary importance and require the exercise of the utmost ingenuity.

This application is a continuation in part of my copending application, Serial No. 24,700, filed June 3, 1935, and entitled "Motor control mechanism", in which the improvement in make and break governor mechanism is claimed, whereas the present invention and application is directed more particularly to ancillary structure permitting of ease in manufacture, compactness and facility in use.

An object of the invention is the provision of a motor for household mixers wherein improved means is provided for controlling the motor and speed control mechanism including an improved control knob and improved actuating means between the knob and control elements within the casing.

Another object of the invention is the provision of a motor having improved space arrangement within the casing accomplished by distributing the electric current from a unit located between the armature and the speed control mechanism and by so proportioning these elements as to provide for actuation of the various manually controlled members from a knob at the end of the casing.

A further object is to arrange the parts of the motor so as to utilize a unitary current distributing element and to provide such an element of improved characteristic which facilitates the manufacture and assembly of the parts and largely eliminates the possibility of troubles developing in service due to loosening or misplacement of the parts, and eliminates the danger of faulty assembly of the type which does not become apparent until the article is in service.

Other objects and advantages will become apparent from the following description and the accompanying drawings, in which Figure 1 is a side elevation of a household mixer embodying my invention;

Figs. 3, 4 and 5 are sections on the line 3—3 of Fig. 2 showing moved positions of the weight members;

Fig. 6 is a section on the line 6—6 of Fig. 5 showing the parts in a position corresponding to that of Fig. 5;

Fig. 7 is a view of the rotatable member showing the face opposite that shown in Figs. 3-5;

Fig. 8 is a section on the line 8—8 of Fig. 2;

Fig. 9 is a section on the line 9—9 of Fig. 2;

Fig. 10 is a view of the cam face of the actuating knob;

Fig. 11 is a section on the line 11—11 of Fig. 2;

Fig. 12 is a view of the back end of the motor unit showing the casing broken away along the line 12—12 of Fig. 11, and Fig. 13 is a wiring diagram of the mixer embodying this invention.

Figure 1:
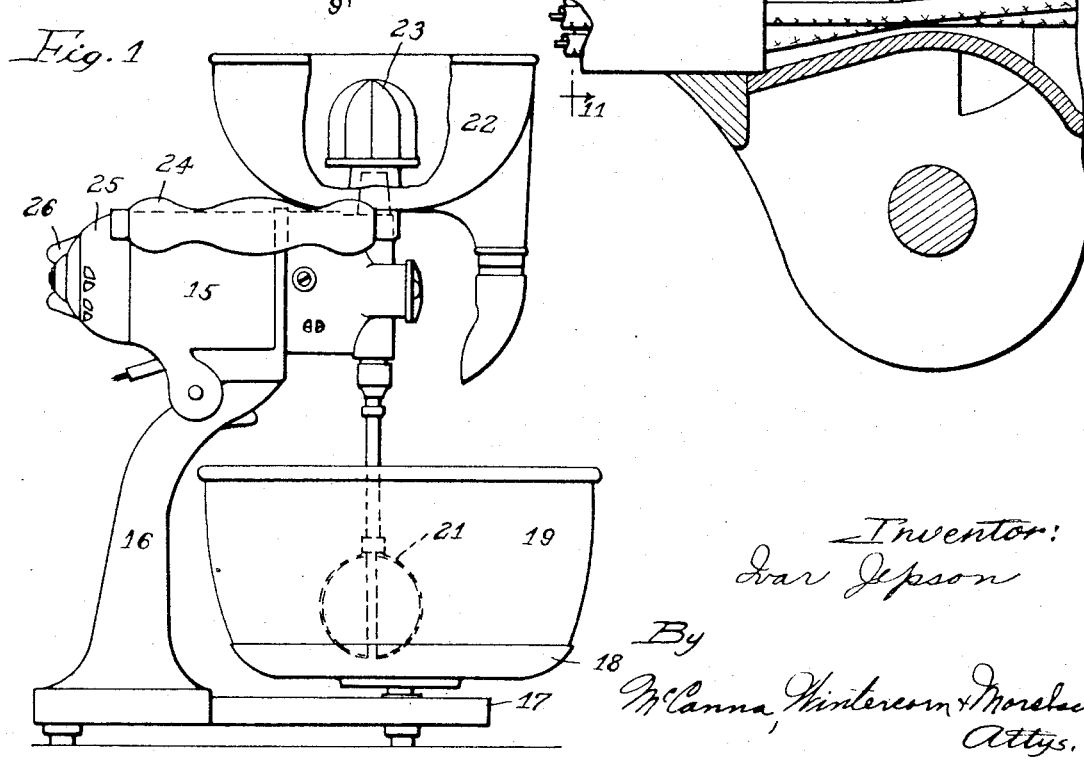

The control mechanism is of particular merit in connection with the conventional type of household mixer such as shown in Figure 1 wherein the numeral 15 designates a motor mixer unit supported on a pedestal carried in turn on a base 17, the base having a rotatable platform 18 for supporting a mixer bowl 19 into which the beaters 21 project. The motor unit carries a juicer bowl 22 having a cone 23 driven from the motor unit. A handle 24 serves for the portable use of the motor unit. A casing 25 is attached to the rear end of the motor unit 15 and carries a knob 26 for the purpose of setting the motor speed.

Figure 2:
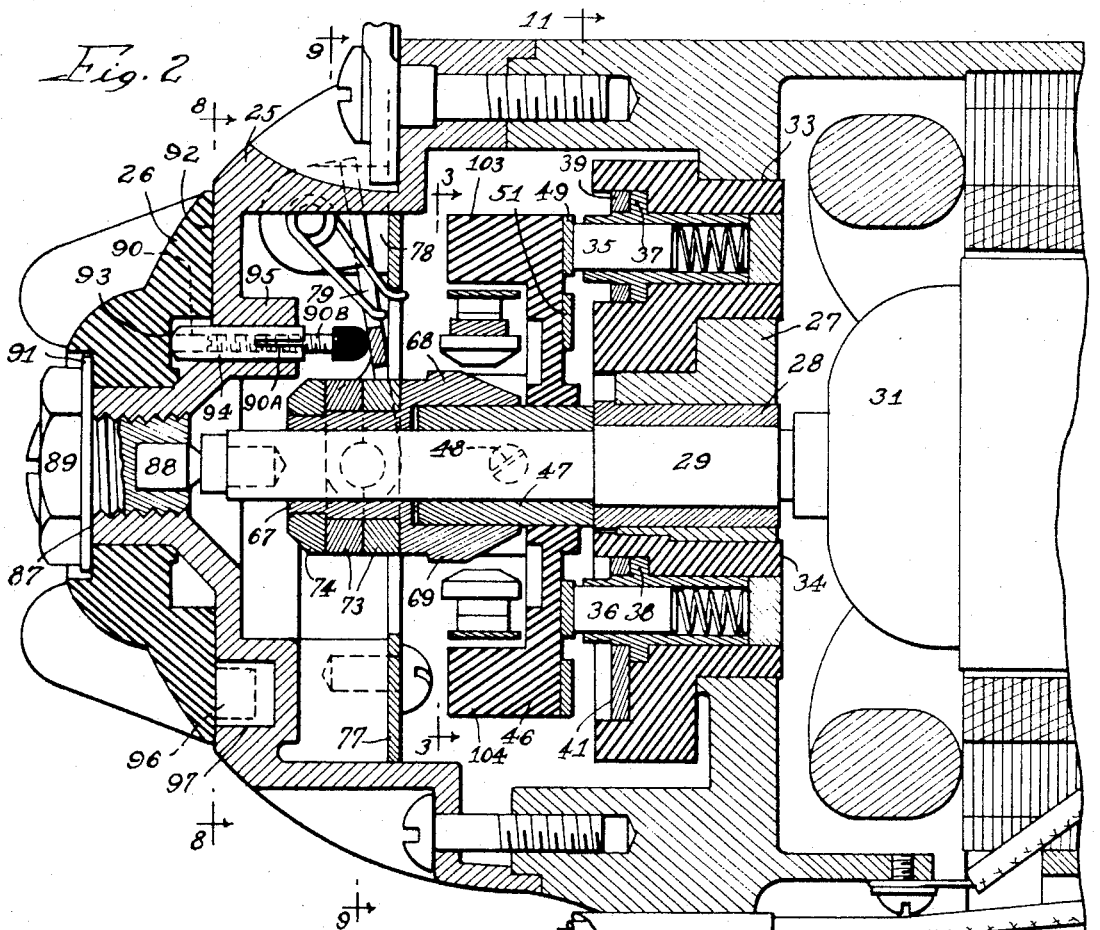
Fig. 2 is a vertical section through the back end of a household mixer motor unit showing the parts of the control mechanism principally in section and one manner of its application to the mixer.

Directing attention now to Fig. 2, the motor casing 15 has a transverse partition 27 integral with the casing and having ventilation openings 30 which carries a sleeve 28 supporting the shaft 29 of the motor designated generally by the numeral 31. A distributor unit has a body designated generally by the numeral 32 of insulation, preferably formed of molded plastic, such as "Bakelite", which is positioned against the back side of the partition 27 and has bosses 33 and 34 projecting into the partition as shown in Fig. 2, brushes 35 and 36 being carried in the bores of the bosses 33 and 34 and being spring pressed toward the rear. The brushes 35 and 36 are surrounded by metallic sleeves or brush holders 37 and 38 molded into the body and hold in position rigid conductors 39 and 41 seated in recesses in the body. A resistor 42 and a condenser 40 (Fig. 13) is connected between the conductors 39 and 41 as shown in Fig. 11, and the conductor 39 carries a spring strip 43 of conducting material having a contact 44 adapted to cooperate with a contact 45 seated in a recess partially enclosed by a wall 45A on the body 32 providing a master switch for turning the current to the motor on and off, the wall 45A insulating the contact from the casing. Suitable electrical connections, including filter condensers 40A (Fig. 13), as will be apparent from the wiring diagram, serve to supply current to the distributor unit.

A rotatable member comprising a disk 46 is positioned on the shaft 29 rearwardly of the distributor unit, the disk being of insulating material and being supported on the shaft through a bearing sleeve 47 attached to the shaft by means of a set screw 48 so that the sleeve and rotatable member rotate with the shaft. Brass rings 49 and 51 are attached to the inner face of the disk in positions to cooperate with the brushes 35 and 36 to conduct electrical energy to contacts presently to be described. Referring now to Figs. 3–5, inclusive, the outward or rearward side of the disk 46 carries a pin 52 which projects through the disk making electrical contact with the ring 51. This pin pivotally carries a weighted arm 53 for rotation with the disk and for rotation about the pin 52 with respect to the disk. This pin it will be noted is eccentric with respect to the axis of the disk. One end of the arm 53 carries a finger 54 fixedly attached thereto at one end and having a button 55 at its opposite end positioned to move toward and away from the axis of the disk upon rotation of the arm 53 about the pin 52. A leaf spring 56 is attached at one end to the same end of the arm 53 and projects along the face of the disk tangentially with respect to the direction of rotation thereof and at its free end carries a contact 57 positioned to engage a stationary contact 58 attached to the disk by means of a bracket 59 electrically connected to the collector ring 49 on the opposite face of the disk whereby the electrical circuit between the collector rings 49 and 51 is open and closed by the opening and closing of the contacts 57 and 58. The opposite end of the arm 53 is in this instance enlarged, as shown at 61, and weighted if necessary so that the resultant of all centrifugal force acting upon the lever pivoted on the pin 52 is to cause the pivoted parts to rotate in a counterclockwise direction on the pin 52 when the rotatable member is in rotation. A spring 62 is coiled about the pin 52, one end 63 thereof engaging the lever and the opposite end thereof being anchored in a projection 64 on the disk, acts to urge the lever in a counterclockwise direction so as to normally maintain the contacts 57 and 58 closed. A pin 65 on the same side of the disk as the pin 52 but on the opposite side of the axis thereof carries lever mechanism 66 similar in all material respects to the parts marked 53—63, respectively, but which parts have no electrical connection with the collector rings, the parts being merely counterbalancing parts for those previously described but being made on the same pattern and of the same weights so as to counterbalance the action of the make and break mechanism in any of its moved positions.

A sleeve 67 is carried on the shaft 29 and has a pair of forwardly extending fingers 68 and 69 overriding the sleeve 47, the disk 46 having forwardly extending segments 71 and 72 adapted to bear against opposite sides of the fingers, as best shown in Figs. 3–5. In this instance the sleeve carries a pair of rings 73 of oilless bearing material retained in place by means of a collar 74, the rings 73 being engaged by means presently to be described for moving the sleeve 67 longitudinally of the shaft. The forward ends of the fingers 68 and 69 have cam surfaces 75 and 76 adapted to be engaged by the buttons 55, as shown in Fig. 6 for the purpose of limiting the degree of rotation of the arm 53 under centrifugal action, as will presently be described.

The casing 25 is bolted to the motor casing and carries on its inner recess a plate 77 having an upstanding ear 78 on its rear face. A bifurcated lever designated generally by the numeral 79 has a pair of ears 81 which act to carry the lever on the rear 78 by means of a pin 82. The opposite bifurcated end of the lever 79 carries pins 83 gaging the rings 73 on opposite sides of the bushing 67 so that movement of the lever 79 about the pin 82 brings about longitudinal movement of the sleeve 67 on the shaft 29 to regulate the position at which the button 55 will engage the cam surface 75. A spring 84 acts in such manner as to urge the sleeve 67 to the right facing Fig. 2, or in other words, so as to cause the button to engage the cam at its highest point. A wick 85 registers with an oil hole 86 to distribute lubricant to the ring 73.

The casing 25 also carries a threaded insert 87 which carries an end thrust bearing 88 for the end of the shaft 29 adjustable by means of a nut 89. The nut 89 also retains in position washer 91 which bears against the knob 26, as shown in Fig. 2, to retain the same in surface contact with the casing 25 as shown at 92.

The knob 26 has a cam slot 93 positioned to receive a pin 94 of square cross-section having sliding reception in a square hole of a boss 95 of the casing 25 and adapted at one end to engage the lever 79, whereby upon rotation of the knob 26 the pin 94 is caused to move longitudinally against the action of the spring 84 to bring about longitudinal movement of the sleeve 67 and the cam fingers 68 and 69, whereby to regulate the speed of the motor. The pin 94 has a threaded bore 90 in its end and longitudinal slots 90A, the bore receiving a screw 90B, whereby upon rotation of the screw the effective length of the pin may be varied for adjustment of the relative operating positions of the lever and the knob. The knob has a hole 90C extending therethrough for adjustment of the screw to adjust the operating relationship between the cam and the lever after the motor is assembled. The square shape of the pin prevents rotation thereof under the influence of the knob and the attendant danger of change in the adjustment. The knob also carries a cam projection 96 received in an arcuate recess 97 on the casing 25, the projection and recess acting as stops for the knob to limit the degree of rotation thereof. The knob 26 also has a cam recess 98 adapted to receive the end of a pin 99 carried in a boss 101 in the casing 25 and passing through the plate 77 to allow the opening of the switch lever 43 against which the end of the pin 99 bears, the lever 43 being spring tensioned to move to its open position as shown in Fig. 12. Insulation 102 is positioned on the end of the pin 99 for obvious reasons. The cam means 93, 96 and 98 are positioned on circles concentric with each other and with the axis of rotation of the knob.

The casing 25 is preferably provided with proper indicia as shown in Fig. 8 for indicating the positions of the dial. The recess 98 is so positioned that the pin 99 is received therein when the dial indicates the off positon. When the knob is rotated out of this position, the switch lever 43 closes the contacts 44 and 45, whereupon the motor starts. When the knob is turned to the point indicated as 1 on the dial, the parts come into the position shown in Figs. 2 and 3, the rotatable member rotates with the motor. As the motor picks up speed, the arm 53 rotates in a counterclockwise direction facing Fig. 3 about the pin 52 until the button 55 engages the cam surface 75. During this increase in speed the contact 57 is being urged or drawn away from the contact 56 by centrifugal force, but as it tends to move, the centrifugal force acting to move the lever maintains the contacts closed. However, when the button 55 engages the cam surface 75 as shown in Fig. 4, the centrifugal force acting on the contact 57 and the tension of the spring 56 come into equilibrium so that upon any increase in speed of the motor, the contact 57 moves away from the contact 58 opening the switch. The speed of the motor then decreases and the switch is again closed because of the decrease in the centrifugal force acting on the contact 57. Thus, so long as the knob occupies the position indicated by the numeral 1 on the dial, this action will be repeated, maintaining the selected motor speed, within the capacity of the motor. It will be seen that the contacts 57 and 58 will remain closed a greater or lesser proportion of the time dependent upon the load upon the motor. It will also be observed that any sudden changes in the speed of the motor brings about very rapid action of the control mechanism. For example, upon a rapid or sudden increase of motor speed such as might be brought about by a quick release of the load on the mixer beaters, the inertia of the contact point 57 will cause it to lag behind the motion of the stationary contact and thus instantly open the contacts. This is augmented by the inertia of the weighted portion 61 of the lever 63, the inertia of which tends to cause rotation about the pin 52 and consequent opening of the contacts. Likewise, a sudden decrease in the motor speed causes the contacts to be instantly closed because of the inertia of the contact point 57 which is free to continue its travel at its previous high rate of speed until it engages the contact 58. As the knob 26 is moved up along the dial, the cam fingers 68 and 69 are drawn to the left facing Figs. 2 and 6, thus allowing the lever 53 to rotate about the pin 52 to a greater and greater degree, thus compensating for the increased impulse on the part of the contact 57 to leave the contact 56 and open the circuit.

When the control is placed in the position to give the highest motor speed, the parts occupy the position shown in Figs. 5 and 6 at which the button 55 engages the cam surface 75 adjacent its lowermost point. With this setting it will be seen that as the motor comes up to speed, the arm 53 rotates about the pin 52 compensating for the opening impulse of the contact 57 until the button 55 engages the cam surface 75. At this point the spring 56 and the contact 57 function in the same manner as in the position shown in Fig. 4, but permit the motor to attain a higher speed before the contacts begin to open and close under the small regulating changes of speed. Abutments 103 and 104 are formed on the dik 86 for the purpose of limiting the outward movement of the contact 57 should anything go wrong with the control mechanism, so that the contact and spring cannot strike some stationary part of the device and further damage the mechanism.

Attention is directed particularly to the simplicity of construction which is such as to offer little if any possibility of becoming out of order. It will be noted that the cams for actuating the switch and the speed control mechanism, and likewise the cam for limiting the rotation of the knob, are all formed directly on the surface of the knob facing the casing, and in this manner the cams, together with the actuating pins or rods are entirely concealed. Likewise the pins 94 and 99 are supported directly in the end of the casing for longitudinal movement by the cam means, thus providing a minimum of elements. It will further be noted that the longitudinal movement of the pin 94 imparted by the cam means 93 is magnified through the instrumentality of the spring pressed lever 79 which normally maintains the pin in contact with the cam and causes the pin to follow the cam contour.

Attention is also directed to the distributor unit best shown in Fig. 11. The body 32 of insulation material is so formed as to seat in the partition and thus to locate the position of the parts. In addition, the bosses serve to surround the brushes and brush holders so as to reduce to a minimum the space utilized by the brushes. The rigid conductors 39 and 41, attached to the brush holders serve to carry the resistor and the switch on the body member. Attention is also directed to the fact that the resistor is located directly in the path of air moving through the casing, and thus in a position to be cooled to the proper degree. The switch is likewise located adjacent the inner side of the casing, and the speed control mechanism is so proportioned in size that the switch may be actuated from the end of the casing. Furthermore, the contact points are protected from the casing by the shape characteristics of the body member 32. The body 32, the brushes and brush holders, the resistor, the switch, and the rigid conductors form together a unitary structure adapted to be secured against the partition as a unit, thereby eliminating a difficult assembly job and the attendant maze of connections commonly present under similar conditions. This unit serves to distribute the current to the various conductors leading to the elements of the motor and the speed control mechanism and are controlled by the cam means on the knob seated against the end of the motor casing.

While I have thus described and illustrated a specific embodiment of the invention, I am aware that numerous alterations and changes may be made therein within the spirit of the invention, and I do not wish to be limited except as required by the prior art and the scope of the appended claims, in which—

I claim:
1. The combination in speed control mechanism for a motor having a casing, of a control knob adapted to seat on the exterior thereof comprising a body having an outer surface provided with shape characteristics forming a hand hold for manual rotation thereof, said body having a centrally disposed opening for support thereof on the motor casing, and a cam surface concentric with said opening for actuating said control mechanism in response to rotation of the knob.

2. The combination in speed control mechanism for a motor having a casing, of a control knob adapted to seat on the exterior thereof comprising a one piece molded body of insulation material, said body having a central opening for rotatable support thereof on the motor casing and having a face complemental to and in close proximity to a surface of the casing, said face having a cam surface arranged for actuating said control mechanism in response to rotation of the knob.

3. The combination in speed control mechanism for a motor having a casing, one end thereof having a face substantially transverse with respect to the longitudinal axis thereof, centrifugal make and break mechanism within said casing for controlling the speed of the motor, and adjusting means for said mechanism comprising an adjusting pin supported for longitudinal movement in said transverse face and offset from the centerline of said casing, a spring pressed lever rotatable on a fixed axis within the casing and positioned for rotation in response to longitudinal movement of said pin, and a knob positioned against said transverse face for rotation about the centerline of said casing, said knob having a surface adjacent the casing provided with a cam face helically disposed with respect to the axis of rotation of said knob and remote therefrom, for imparting longitudinal movement to the pin.

4. The combination in speed control mechanism for a motor of a control knob adapted to seat on the exterior thereof comprising a body having an outer surface shaped to conform with the outer surface of the motor, said surface having a transverse rib for actuation thereof, the body also having a central opening for rotatable support thereof, and a flat surface for abutment against the exterior of the motor provided with a helical cam face and a switch cam for control of the motor.

5. The combination with an electric motor having an elongated casing and means on one end of the casing for rotatably supporting a knob, of speed control mechanism comprising a control knob, a switch and a speed control mechanism located within the casing, said knob having a surface complemental to the exterior of said casing, a plurality of cam means on said surface helically arranged with respect to the axis of rotation thereof and remote therefrom, and means for actuating said switch and said speed control mechanism extending through said casing into cooperative relationship with said cam means.

6. The combination with an electric motor having an elongated casing, of speed control mechanism comprising a control knob rotatably supported on an end of said casing having a surface complemental with said casing, a switch and a speed control mechanism within said casing, a plurality of cam means positioned on said surface on circles concentric with the axis of rotation of said knob, pins supported in and extending through said casing into cooperative relationship with said cam means for actuating said switch and control means, and means acting between the casing and one of said cam means for limiting the rotation of said knob.

7. The combination with an electric motor having an elongated casing, of speed control mechanism comprising a control knob rotatably supported on an end of said casing, said knob having a surface complemental with said casing, a switch and a speed control mechanism within said casing, a plurality of cam means positioned on said surface on circles concentric with the axis of rotation of said knob, a pin extending through said casing into cooperative relationship with one of said cam means to actuate said control means, said pin having means for varying the effective length thereof, means extending through the casing into cooperative relationship with another of said cam means to actuate said switch mechanism, and means acting between the end of the casing and said cam means for limiting the rotation of said knob.

8. The combination with an electric motor having an elongated casing having a flattened end provided with an axially disposed boss projecting therefrom and a plurality of control openings, of speed control mechanism comprising a control knob positioned for rotation on said boss, said knob having a surface opposed to and in close proximity to said end of a size to largely cover the same, a plurality of cam means on said surface positioned on circles concentric with the axis of rotation of said knob, a switch and a speed control mechanism within said casing, a sliding pin in one of said control openings extending between one of said cam means and said speed control mechanism to actuate the latter upon rotation of said knob, said pin having means for varying the effective length thereof, means extending through another of said control openings into cooperative relation with a second of said cam means to actuate said switch mechanism upon rotation of said knob, and means operative upon said cam means for limiting the rotation of said knob.

9. The combination with an electric motor having an elongated casing, of speed control mechanism comprising a control knob rotatably supported against one end of said casing, said knob having a surface in close proximity to the casing, cam means on said surface operative for imparting movement by rotation of said knob, a speed control mechanism within said casing, a sliding pin extending through said casing in the area covered by said knob into cooperative relationship with said cam means for actuating said control mechanism upon rotation of said knob, said pin having screw means for varying the effective length thereof, and means for preventing rotation of said pin to prevent accidental change in the effective length of said pin.

10. The combination with an electric motor having an elongated casing, of speed control mechanism comprising a control knob rotatably supported against one end of said casing, said knob having a surface in close proximity to the casing, cam means on said surface operative for imparting movement by rotation of said knob, a switch and a speed control mechanism within said casing, a lever pivotally supported within said casing for rotation toward and away from the end of the casing to adjust the speed control mechanism, spring means for urging said lever toward the end of the casing, and a sliding pin extending through the casing in the area covered by said knob and acting between said lever and said cam means to urge said lever away from the end of the casing to adjust the speed control mechanism.

11. The combination with an electric motor having an elongated casing, of speed control mechanism comprising a control knob rotatably supported against one end of said casing, said knob having a surface in close proximity to the casing, a plurality of cam means on said surface positioned on circles concentric with the axis of rotation of said knob, a switch and a speed control mechanism within said casing, sliding pins extending through said casing in the area covered by said knob into cooperative relationship with said cam means for actuating said switch and said control mechanism upon rotation of said knob, means for varying the effective length of at least one of said pins comprising a threaded connection between the ends thereof, and means for preventing rotation of said pins to prevent relative rotation between the ends of the pins in response to rotation of the knob.

12. The combination with an electric motor having an elongated casing, of speed control mechanism comprising a control knob rotatably supported against one end of said casing, said knob having a surface in close proximity to the casing, a plurality of cam means on said surface positioned on circles concentric with the axis of rotation of said knob, a switch and a speed control mechanism within said casing, sliding pins extending through said casing in the area covered by said knob into cooperative relationship with said cam means for actuating said switch and said control mechanism upon rotation of said knob, means for varying the effective length of at least one of said pins comprising a threaded connection between the ends thereof, and means for preventing rotation of said pins to prevent relative rotation between the ends of the pins in response to rotation of the knob, said knob having an opening therethrough positioned for registration with said pin for predetermining the length thereof after assembly of the motor.

13. The combination with an electric motor having an elongated casing, a transverse partition adjacent one end thereof, and a motor shaft within said casing having one end thereof extending through said partition, of a body of insulation material secured to said partition on the side thereof adjacent said end, a resistor and a switch carried on said body, the switch being positioned adjacent the inner wall of the casing, speed control mechanism carried on said shaft between said body and said end rotatable with said shaft and of substantially smaller diameter than the inner diameter of said casing, a pin extending through the end of the casing adjacent the centerline thereof for controlling said speed control mechanism, a pin extending through the end of the casing at a more remote point and passing along the periphery of said speed control mechanism to actuate said switch, and cam means positioned wholly on the exterior of said casing for moving said pins to control the motor.

14. The combination with a motor casing provided with a laterally disposed partition, of a distributor unit comprising a body of insulation material having shape characteristics for seating in said partition, means for carrying brushes and springs, electrical conductors for the attachment of said means to said body and for the supply of electrical energy thereto, a pair of switch members, and an electrical resistor, the various elements being connected together as a unitary whole and supported on said partition through said body.

15. The combination in speed control mechanism, of a shaft make and break mechanism carried on said shaft, a casing having a laterally disposed partition provided with a centrally disposed bearing for the reception of said shaft, a body of insulation material shaped to seat against said partition, spaced brush holders seated in said body, an electrical resistor, means for supporting said resistor on said body in circuit with said brush holders, a switch on said body comprising a fixed contact and a movable spring pressed contact, and means for securing the body on said partition to support the brush holders, resistor and switch thereon in a fixed, insulated position.

16. The combination in a motor having an armature shaft and an armature and a speed control mechanism carried on said shaft, of a motor casing having a laterally disposed partition provided with a centrally disposed bearing for supporting said shaft at a point intermediate the armature and the speed control mechanism, and a distributor unit secured as a unit against the side of said partition facing said speed control mechanism comprising a body of insulation material, a pair of spaced brush holders seated in said body, an electrical resistor in circuit with said brush holders, a switch on said body having a fixed contact and a spring pressed movable contact, and means for securing said distributor elements together for installation and operation as a unitary whole.

17. The combination in a motor having an armature shaft and an armature and a speed control mechanism carried on said shaft, of a motor casing having a laterally disposed partition provided with a centrally disposed bearing for supporting said shaft at a point intermediate the armature and the speed control mechanism, a distributor unit for distributing current to the various parts of the motor and speed control mechanism, said unit comprising a switch having a stationary contact and a spring pressed movable contact, a resistor, spaced brush holders, rigid conductors connecting said distributor elements in operative relationship, a body of insulation material having recesses for the seating of said brush holders and said conductors to secure the distributor elements together as a unitary whole, and means for securing the body in fixed position against the partition.

18. The combination in a motor having an armature shaft and an armature and a speed control mechanism carried on said shaft, of a motor casing having a laterally disposed partition provided with a centrally disposed bearing for supporting said shaft at a point intermediate the armature and the speed control mechanism, a distributor unit for distributing current to the various parts of the motor comprising a switch having a stationary and a movable contact, a leaf spring for supporting the movable contact, a resistor, spaced brush holders, a rigid conductor connecting one end of said resistor, one of said brush holders and said leaf spring, a rigid conductor for connecting the opposite end of said resistor and the other of said brush holders, a body of insulation material having recesses for the seating of said brush holders and said conductors to secure the distributor elements together as a unitary whole, and means for securing the body member in fixed position against said partition.

19. The combination in an electric motor having an armature shaft, an armature thereon and a speed control mechanism thereon, of a motor casing having a laterally disposed partition provided with a centrally disposed bearing for supporting said shaft at a point intermediate the armature and the speed control mechanism, and a distributor unit secured as a unit against the side of said partition facing said speed control mechanism, said unit comprising a body of insulation material having projections on the side adjacent said partition for interfitting with said partition to locate the body and enclose brush holders, a pair of spaced brush holders seated in said body and extending into said projections, an electrical resistor in circuit with said brush holders, a switch on said body having a fixed contact and a spring pressed movable contact, and means for securing said distributor elements together for installation and operation as a unitary whole.

20. The combination recited in claim 17 wherein said contacts are located adjacent the inner wall of the motor casing and the body has shape characteristics for partially enclosing said contacts to prevent leakage to the casing.

IVAR JEPSON.